April 11, 1939. W. W. RIEDEL 2,154,075
AUTOMATIC ADJUSTMENT DEVICE FOR BRAKES
Filed Nov. 5, 1937

Inventor
Walter W. Riedel
By
Blackmore, Spencer & Flint
Attorneys

Patented Apr. 11, 1939

2,154,075

UNITED STATES PATENT OFFICE 2,154,075

AUTOMATIC ADJUSTMENT DEVICE FOR BRAKES

Walter W. Riedel, Dayton, Ohio, assignor to General Motors Corporation, Detroit, Mich., a corporation of Delaware Application November 5, 1937, Serial No. 172,889

10 Claims. (Cl. 188—79.5)

This invention relates to vehicle brakes. It is occasioned by the need for automatically adjusting the release position of brake shoes to accommodate changes in the lining thickness.

An object of the invention is to provide for such automatically changed positions of the shoes when in inactive position by a construction which shall be reliable, efficient and relatively inexpensive and which may be easily adjusted to effect any desired shoe clearance.

Other objects and advantages will be understood from the following description.

Figure 1:
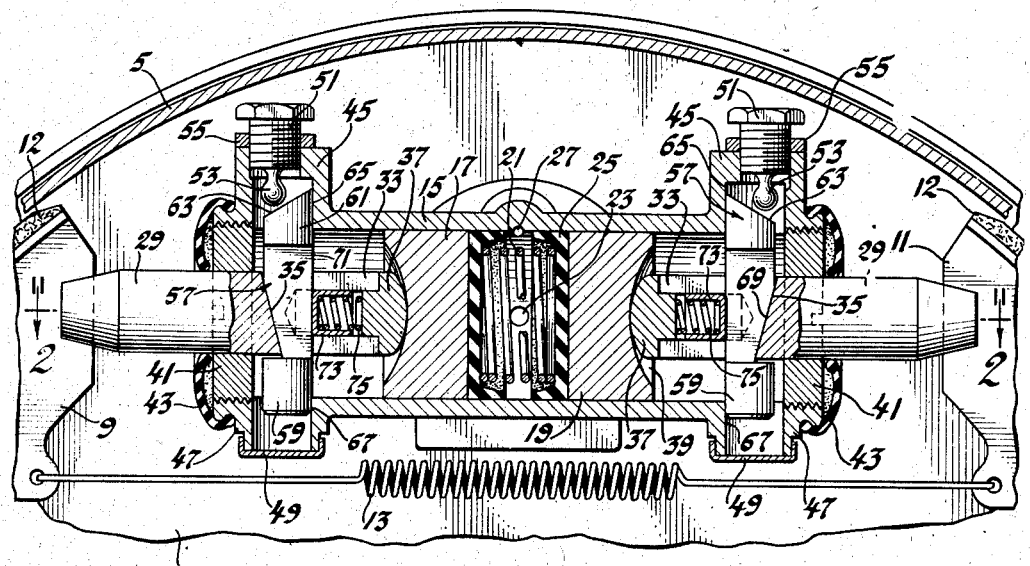
Figure 1 is a vertical sectional view through the brake drum, the wheel cylinder and related parts.

Referring to the drawing, numeral 5 is used to designate a brake drum, such a drum as is usually carried by a vehicle wheel. The relatively fixed backing plate or drum closure is marked 7.

Figure 2:
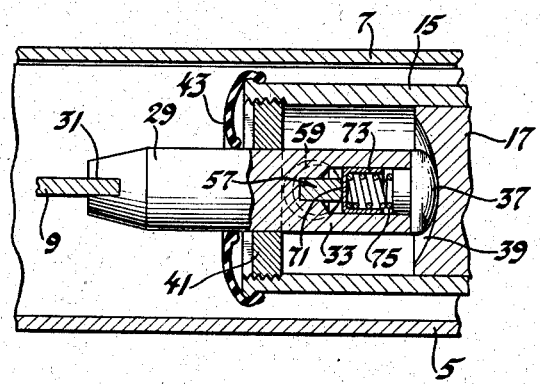
Figure 2 is a section on line 2—2 of Figure 1.
Figure 3:
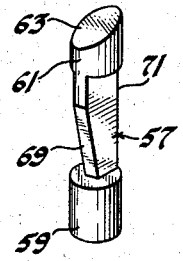
Figure 3 shows a detail in perspective.

Two opposed shoes marked 9 and 11 are to be expanded into frictional contact with the drum. These shoes are equipped with lining marked by numeral 12. A coil spring 13 is shown as a yielding means to withdraw the shoes from their active to their inactive positions. This spring is connected to both shoes as shown. Secured to the cover 7 in any convenient way is a substantially conventional wheel cylinder 15. It is provided with pistons 17 and 19 and a spring 21 therebetween. Each piston is provided with a sealing cup 25. Between the pistons, hydraulic medium is injected from a suitable source, not shown, through opening 23. Provision is made for permitting the escape of air by a suitable closure, not shown, associated with an opening 27. Push rods 29 serve as the means by which the movement of the pistons is transmitted to the shoes. Each push rod is formed with an end slot 31 adapted to straddle the web of the shoe. The opposite end of the push rod is formed with forks, reference being made to Figure 2 where these forks or arms are marked 33. The push rod has a sloping surface 35 at the junction of the forks. A cap 37 carried by the ends of the forks is seated in a recess 39 of the piston. At each end of the cylinder there may be used a threaded plug 41 and a dust guard 43. Diametrically opposite apertured bosses 45 and 47 are seen at each end of the cylinder. The lower boss is closed by a cap 49 and into the upper boss there is adjustably threaded a plug 51. The plug 51 is equipped with a rounded abutment 53 and the plug may be held in adjusted position by a lock nut 55.

Reciprocable between the arms 33 and within the apertures of the bosses 45 and 47 is a plunger designated as a whole by numeral 57. The plunger has cylindrical ends 59 and 61 which ends have a diameter which is less than that of the apertures of the bosses. The upper end 61 has a sloping surface 63. This sloping surface is in close proximity to but slightly spaced from the abutment 53 on the end of the plug 51 when the plunger is in contact with the surfaces 65 and 67 of the walls of the apertures remote from the ends of the cylinder. Between the ends, the plunger has a sloping surface 69 on one side thereof, this surface matching the sloping face 35 of the push rod. The opposite face 71 of the plunger is straight and is engaged by a hollow cup 73 within which is a coil spring 75, the spring seated against the cap 37. The operation of the device will be obvious but may be briefly described.

Figure 1 is intended to represent the parts in the positions they occupy when the retracting yielding spring 13 has withdrawn the shoes from contact with the drum. The push rod in its movement of retrogression has carried the plunger along with it. The limit of movement is determined by the engagement of the plunger with the cylinder at points 65 and 67. The sloping face at 35 is sufficiently steep so that the yielding device 13 is unable to reciprocate the plunger vertically. There is a gap between face 63 of the plunger and the knob 53. When fluid is admitted to the space between the pistons they spread apart and through the instrumentality of the push rods the shoes are forced into frictional engagement with the drum. As the push rod moves, the spring 75 causes the plunger to move along with it. If the shoe linings are not worn, drum contact may be made before surface 63 of the plunger contacts the knob 53. Whenever the lining becomes worn the knob 53 and the surface 63 contact prior to the full shoe and drum contact. When this occurs the completion of the movement of the push rod will be accompanied by a vertical reciprocation of the plunger as a result of the shape of surface 63. This vertical reciprocation determines a new position of slope 69 relative to slope 35. When the retracting spring again returns the parts to their inactive position, and since in this operation there is no reciprocation of the plunger the newly determined relative position of faces 35 and 69 results in a new retracted position of the push rod, one wherein the lining clearance is substantially the same as before the lining became worn. It will be obvious that the return movement of the push rod is limited by the engagement of the plunger with the surfaces 65 and 67, which engagement is accompanied by the opening up of the gap between the knob and the surface 63. In this way the progressive wear of the shoe lining is accompanied by changes in the position of plunger 57 relative to the push rod and the changes continue until the linings are so worn down as to require replacement. It will be evident that the gap between the knob and surface 63 is a measure of the shoe clearance and that if it be desired to vary the shoe clearance, this objective is readily accomplished by an adjustment of the threaded plug. The expedient is simple and inexpensive. It is composed of but few and rugged parts. The gap may be readily adjusted to provide such clearance as to accommodate for all anticipated expansion and contraction of the drum which takes place as the result of changes in temperature so as to avoid any possibility of drag of the shoes.

It will also be readily appreciated that the invention is capable of embodiment in a construction wherein such a push rod with its adjustment is actuated by means other than a reciprocable piston of a hydraulic cylinder. Furthermore it may be said that while the device has been invented for use on brakes it will be evident that it may be used for actuating other mechanical devices.

I claim:

1. In combination, a push rod, means to reciprocate said push rod from an inactive to an active position, a plunger mounted to move bodily with said push rod and also across the path thereof, said push rod and plunger having cooperating sloping faces, spring means to hold said faces in contact, an abutment adapted to be engaged by said plunger when moved jointly with the push rod to its inactive position, and adjustable means to engage and reciprocate said plunger along said sloping faces to determine changed inactive positions of the push rod.

2. In combination, a cylinder, a piston reciprocable therein, a push rod reciprocated by said piston, a plunger mounted in said cylinder for bodily movement jointly with the push rod and also for movement across the path of movement of said push rod, said push rod and plunger having sloping faces, spring means to hold said faces in contact, said cylinder constructed with an abutment wall to limit the return movement of the plunger and adjustable means to engage and reciprocate said plunger along said sloping faces when the joint movement exceeds a predetermined limit to determine changed idle positions of the push rod upon contact of the plunger with said abutment wall.

3. The invention defined by claim 2, said last named means comprising a plug threaded into said cylinder and an end face formed on said plunger and angularly related to the axis thereof.

4. The invention defined by claim 2, together with yielding means to return said push rod, said sloping face having an inclination such as to prevent relative sliding of the plunger thereon under the influence of said yielding means.

5. In combination with a drum, a brake shoe adapted to engage said drum, a reciprocable brake actuating member, a push rod between and in contact with said shoe and actuating member, a plunger mounted to move jointly with said push rod along the axis of the latter and also to move across the path of movement thereof, said push rod and plunger having sloping faces defining a plane at an angle to the paths of movement of both the plunger and push rod, spring means carried by the push rod to hold said sloping faces in contact, means adapted to engage and reciprocate said plunger when the joint movement of the push rod and plunger exceeds a predetermined limit.

6. In combination with a drum, a brake shoe adapted to engage said drum, a reciprocable brake actuating member, a push rod between and in contact with said shoe and actuating member, a plunger mounted to move jointly with said push rod along the axis of the latter and also to move across the path of movement thereof, said push rod and plunger having sloping faces, spring means carried by the push rod to hold said sloping faces in contact, said plunger having an inclined end face and an adjustable member to engage said end face and reciprocate said plunger when the joint movement of the push rod and plunger exceeds a predetermined limit.

7. The invention defined by claim 5, together with stop means positioned to be engaged by said plunger and limit its movement along the axis of the push rod.

8. In combination, a brake drum, a brake shoe, a cylinder, a piston mounted therein for reciprocation, a reciprocable push rod between and in contact with said piston and shoe, said push rod having a slot terminating in a sloping face, said cylinder having diametrically opposite apertures cylindrical in section, a plunger having a mid portion with a sloping face engaging the sloping face of said push rod, spring means within and carried by said push rod to maintain said sloping faces in contact, said plunger having cylindrical ends of less diameter than the diameter of said apertures and positioned therein, and means in one of said apertures adapted to engage and reciprocate said plunger when the plunger is moved beyond a predetermined limit.

9. The invention defined by claim 8, said last named means comprising a plug adjustable in said aperture and a sloping wall on the adjacent end of said plunger.

10. In combination, a brake shoe, a hydraulic brake cylinder, a piston reciprocable therein, an axially reciprocable push rod between the shoe and the piston, said cylinder having diametrically opposite apertures, a plunger having cylindrical ends within but of less diameter than the diameter of said apertures, said push rod and plunger having sloping faces, spring means carried by said push rod to hold said faces in contact whereby said plunger moves bodily with and in the direction of movement of said push rod, the engagement of the plunger with the walls of the apertures determining the release position of the push rod, and means to engage and reciprocate said plunger across the path of movement of the push rod whereby changed release positions of the push rod are obtained by the engagement of the plunger with the wall of the apertures.

WALTER W. RIEDEL.